(No Model.)
E. J. COLBY.
COIN CONTROLLED OPTICAL INSTRUMENT.
No. 436,905. Patented Sept. 23, 1890.
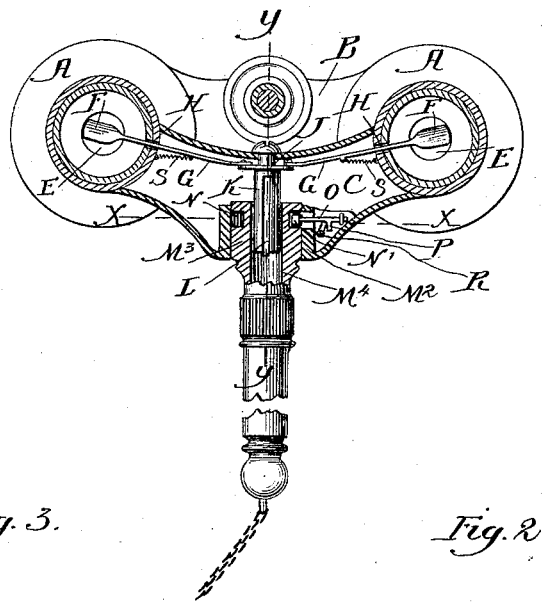
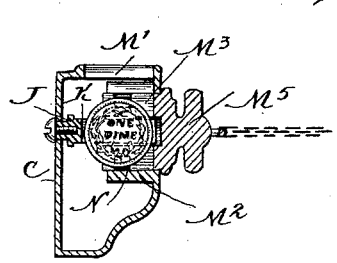
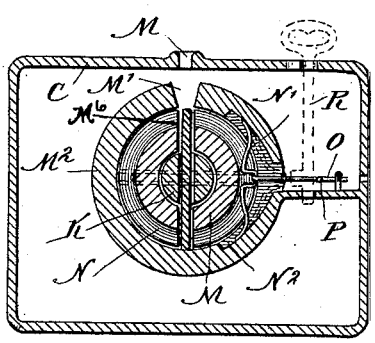
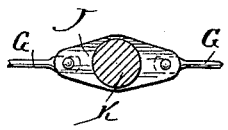
Witnesses:
Celeste P. Chapman.
Davida J. Johnson.
Inventor:
Edward J. Colby.
By Francis W. Parker
Attorney.

UNITED STATES PATENT OFFICE.

EDWARD J. COLBY, OF CHICAGO, ILLINOIS.

COIN-CONTROLLED OPTICAL INSTRUMENT.

SPECIFICATION forming part of Letters Patent No. 436,905, dated September 23, 1890.

Application filed November 25, 1889. Serial No. 331,409. (No model.)

*To all whom it may concern:*

Be it known that I, EDWARD J. COLBY, a citizen of the United States, residing at Chicago, in the county of Cook and State of Illinois, have invented a certain new and useful Improvement in Coin-Controlled Optical Instruments, of which the following is a specification.

My invention relates to coin-controlled optical instruments, and has for its object to provide optical instruments with coin-controlled sight-obstructing devices, so that the same cannot be used without the introduction of a coin or other such object.

My invention is illustrated in the accompanying drawings, wherein—

Figure 1 is a section through an opera-glass with my device attached. Fig. 2 is a detail section view on the line X X. Fig. 3 is a detail section view of the unlocking mechanism on the line Y Y and showing a modification of the handle. Fig. 4 is a detail of the rotating slide-operator.

Like parts are indicated by the same letters in all the figures.

A A are the tubes of an opera-glass; B, the cross-bar; C, a hollow cross-bridge; E E, the focus or sight-apertures of such tubes; F F, slides, which normally intercept such apertures; G G, arms on which they are secured, and which pass into the tubes through the apertures H H and also within the hollow bridge C, and which are secured or pivoted to the plate J on the tube or rod K. This tube or rod is slotted at L, which slot normally registers with the slot M in the hollow case or bridge C, and also with the slot M' in the thimble M², within which freely rotates the head M³ on the handle M⁴ or knob M⁵, and the slot M⁶ in the head. The head M³ has an annular groove N, into which projects the notched spring-plate N', which lies in the recess N² in the inner surface of the thimble M². A rod O, secured to the notch in the spring N', is provided with a lug P, which is engaged by the key R to retract the rod O and thus withdraw the spring N' from the annular groove N within its recess N², as indicated in dotted lines in Fig. 2.

I have devised many kinds of coin-controlled or coin-freed mechanisms to accomplish the same result, but I have concluded that the form of device above described and shown is the best and simplest form at present in my mind. It must be apparent, however, that the details of structure could be greatly varied, the object being only to project into the line of sight of an optical instrument something which will obstruct the same and render its use impossible until such obstruction has been removed, either by the instrumentality of a coin or similar object, thus making the optical instrument coin-controlled.

The use and operation of my invention are as follows: The device, when formed in connection with an opera-glass, as indicated in the drawings, may be secured by means of a chain, as indicated in Fig. 1, in any desired position when the same is to be used—as, for instance, in a theater—adjacent to the seat. The spring N' normally extended, and thus projecting into the groove N, retains the head M³ and handle M⁴ in secure attachment to the opera-glass. This handle may be freely turned about its axis or the glasses freely rotated on it without removing the slides F F from the line of sight, and if any one desires thus to remove the slides, and hence to make the glass capable of use, he must introduce a coin of the suitable size—as, for instance, ten cents—into the slot M, whence it passes through the slot M' and into the slot L in the sleeve or tube or rod K. Here it falls into the position shown in full lines in Fig. 2. If, now, the handle or knob be turned, the coin resting both in the slot L in the rod K and in the slot M⁵ through the head M³ will cause such rod to rotate until the coin engages the notch in the spring N', as indicated in dotted lines in Fig. 2. Thus the rod K and disk or plate J are rotated through ninety degrees and the slides are removed from the line of sight, the parts locked from further motion, and the coin cannot be removed. When the use of the glass is finished, the person in charge will apply the key R in the manner indicated, and, withdrawing the spring N' into its recess, will permit the head M³ with the coin therein to be removed. It may then be reinserted and the spring N' released to engage the groove. In the meantime the spiral springs S S have restored the slides to their normal position so as to obstruct the line of sight, and the device is ready for use again.

Having thus described my invention, what I claim, and desire to secure by Letters Patent, is as follows:

1. In a coin-controlled optical instrument, the combination of a chain with a removable handle, to which it is secured, said handle itself secured rotatably to the instrument, and coin-controlled sight-obstructing devices forming part of the optical instrument and adapted to be rotated by the operation of the handle.

2. In an optical instrument, the combination of the tubes and sight-obstructing devices with a removable rotatable coin-receiving part adapted to remove the obstructions from the line of sight.

3. In an optical instrument, the combination of the tubes and sight-obstructing devices with a removable rotatable coin-receiving part adapted to remove the obstructions from the line of sight, and locking mechanism which holds the obstruction out of the line of sight so long as the coin-receiving portion with the coin therein is secured to the instrument, and springs to restore the obstructions to the line of sight when the coin and the receiver are removed.

EDWARD J. COLBY.

Witnesses:
FRANCES W. PARKER,
CELESTE P. CHAPMAN.